Oct. 4, 1927.
F. H. HEADLEY
PERAMBULATOR
Filed Jan. 19. 1924
1,644,473
2 Sheets-Sheet 1
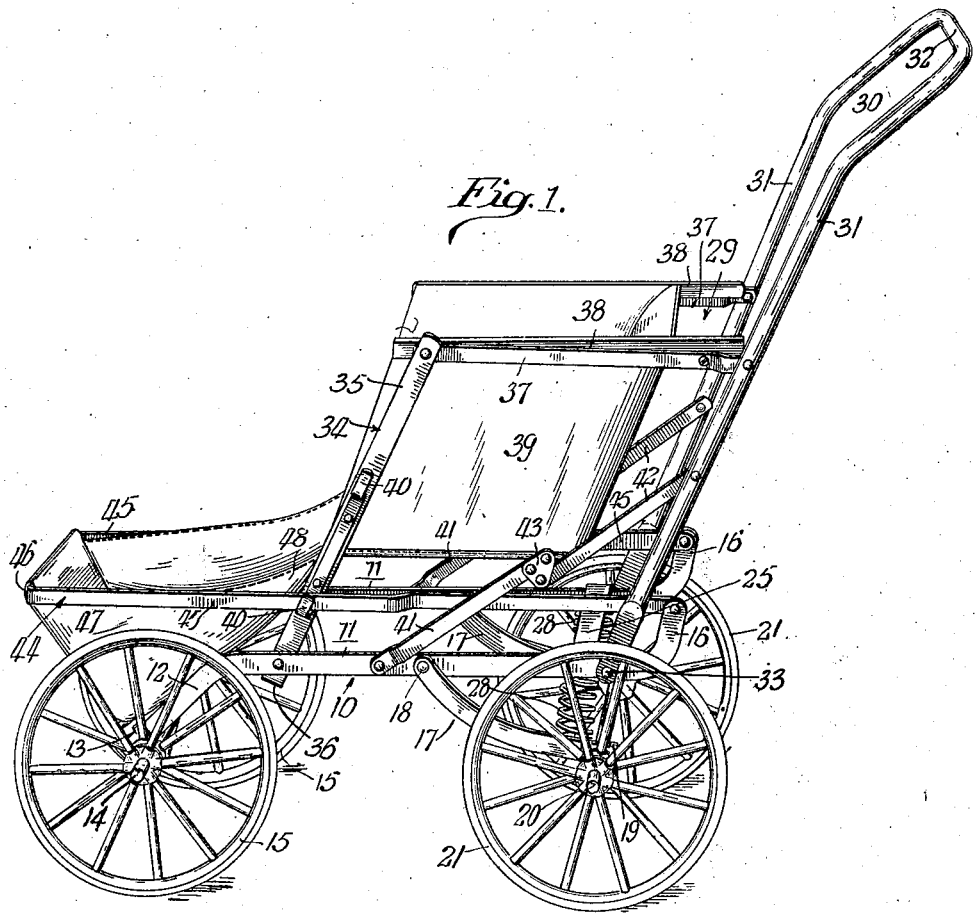
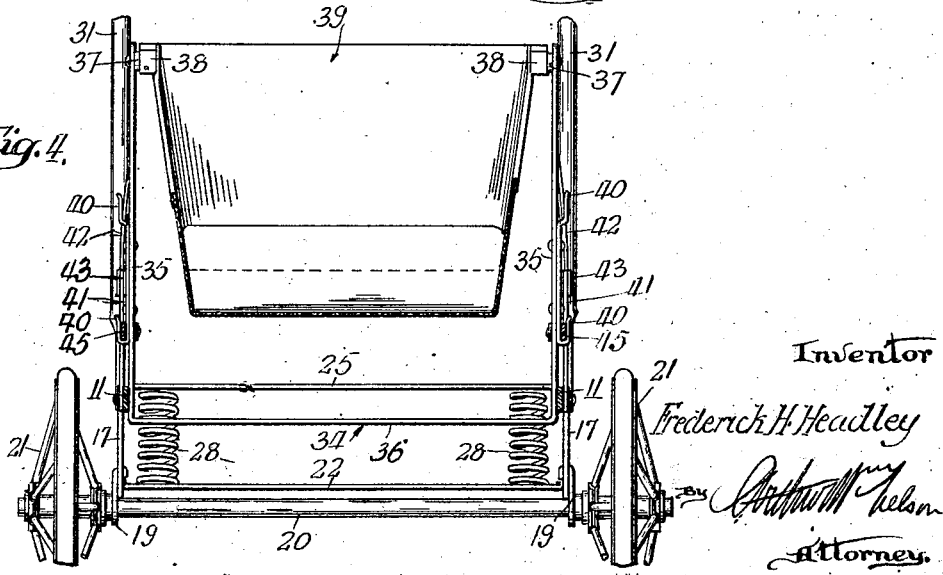
Inventor
Frederick H. Headley
By
Attorney.

Oct. 4, 1927.  
F. H. HEADLEY  
PERAMBULATOR  
Filed Jan. 19, 1924  
1,644,473  
2 Sheets-Sheet 2
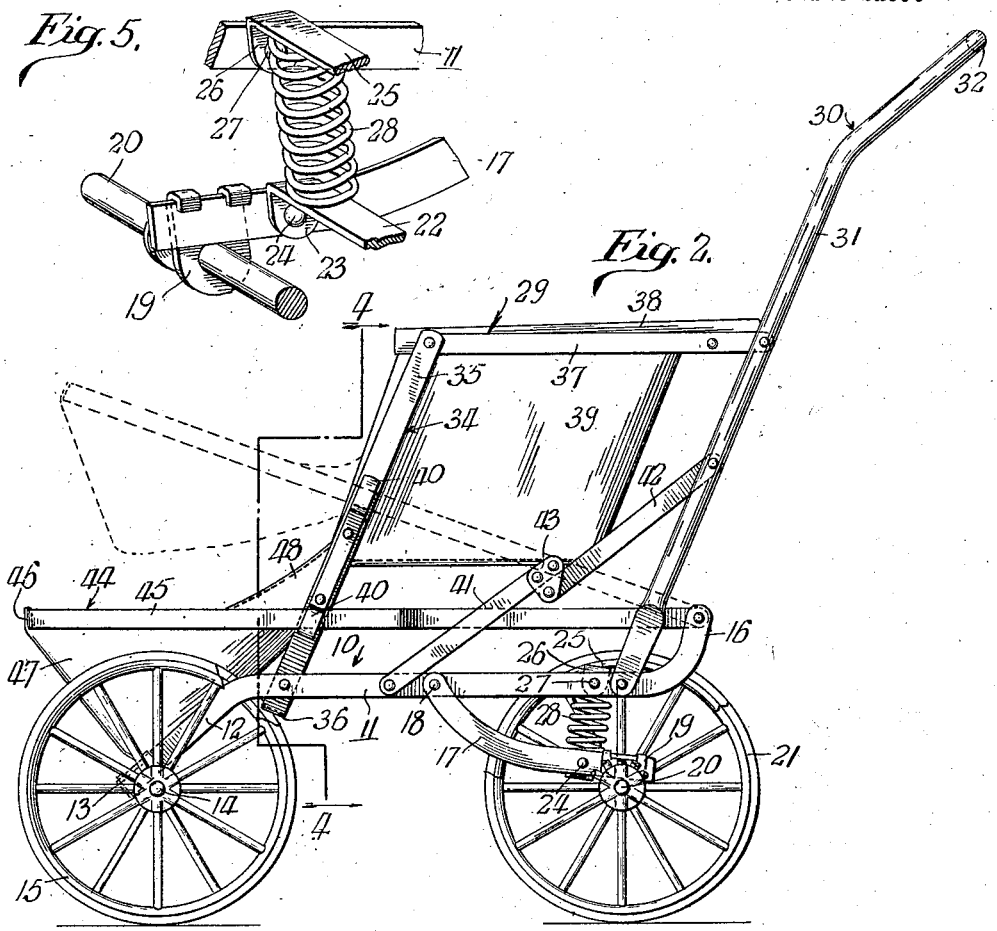
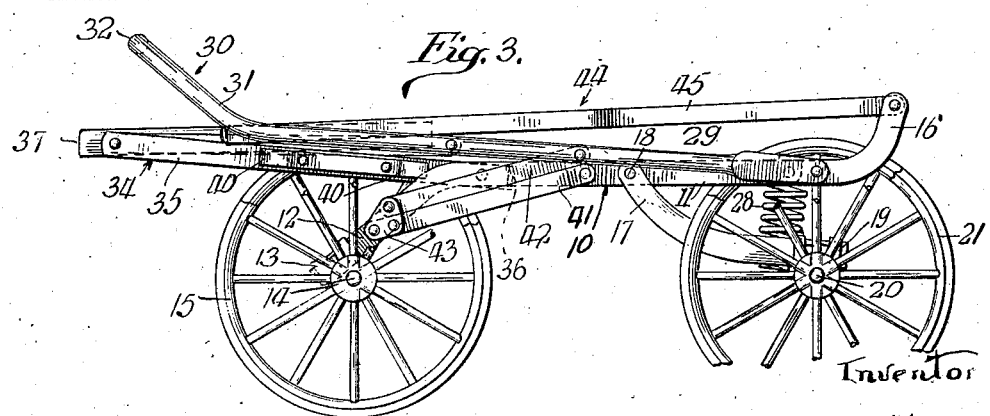
Inventor  
Frederick H. Headley  
Attorney Patented Oct. 4, 1927.

1,644,473

UNITED STATES PATENT OFFICE.

FREDERICK H. HEADLEY, OF NORTHFIELD, NEAR BIRMINGHAM, ENGLAND.

PERAMBULATOR.

Application filed January 19, 1924, Serial No. 687,183, and in Great Britain October 12, 1923.

This invention relates to improvements in perambulators and consists of the matters hereinafter described and more particularly pointed out in the appended claims.

One of the primary objects of the invention is to provide a perambulator which may be readily collapsed or folded so that it will occupy but little space or may be easily carried about.

Another object of the invention is to provide an improved shock absorbing construction between the rear axle of perambulator and the main frame or chassis thereof, so that in wheeling the perambulator over a curb or like projection, no shock or jar is imparted to the occupant of the perambulator.

Another object of the invention is to so construct the perambulator that it will be light in weight yet strong and rigid, so that the parts thereof will not easily warp or bend out of shape.

In the drawings:

Fig. 1 is a perspective view of a perambulator embodying my invention.

Fig. 2 is a view in side elevation of the same when "set up" for use.

Fig. 3 is another view in side elevation of the same, showing the parts in the relation they bear to one another when the perambulator is in a collapsed or folded condition.

Fig. 4 is a detailed cross sectional view as taken on the line 4—4 of Fig. 2.

Fig. 5 is a detailed perspective view showing the manner of mounting the rear end of the main frame or chassis with reference to the rear axle.

Referring now in detail to that embodiment of the invention illustrated in the accompanying drawings; 10 indicates the chassis or main frame of the perambulator which, as shown herein, comprises a pair of longitudinally extending edgewise arranged flat bars 11—11 spaced a suitable distance apart. The front ends 12 of said bars are inclined downwardly and to said ends are secured clips 13 in which the front axle 14 of the perambulator is fixed. On said axle outside of the frame bars 11 are journalled the front wheels 15. The rear ends 16 of the frame bars 11 are curved upwardly as shown, for a purpose to appear later.

17—17 indicates what might be termed the "radius bars" of the perambulator. Said bars are pivotally connected at their front ends to the frame bars 11 at a point between their ends by rivets 18, and curve downwardly and rearwardly towards their rear ends which carry bracket clips 19 similar to the clips 13 before referred to. In said clips is fixed the rear axle 20 of the perambulator and journalled on said axle outside the radius bars are the rear wheels 21.

The rear ends of the radius bars 17 are connected together just forward of the rear axle 20 by a cross bar or reach 22 which includes depending ears 23 at its ends and said ears are secured to said radius bars by suitable rivets 24 (see Fig. 5). 25 indicates a similar cross bar or reach, the ears 26 of which are secured to the frame bars 11 in a plane a short distance to the rear of that of the reach 22 by rivets 27. Expansion coiled springs 28 are interposed between said cross bars, near the frame bars 11—11 and act to absorb any shock or jar which otherwise would be imparted to the chassis when the rear wheels pass over a projection or when the perambulator is wheeled over a curb as in passing from the sidewalk to the street pavement.

Mounted on the chassis as will more fully appear is a parallelogram frame 29 of which the perambulator handle bar forms a part and the frame supports the seat of the perambulator and is so constructed as to be folded or collapsed to reduce the height of the perambulator so that it may be more easily carried or readily stored in a comparatively small space.

30 indicates the handle bar of the perambulator, said handle bar comprises a single, tubular, inverted U shaped member which includes the side legs 31—31 and a top cross bar 32. The bottom ends of the legs 31 of the handle bar are flattened and embrace the outer surfaces of the frame bars 11—11 and are pivotally connected thereto at a point above and in the plane of the rear axle by rivets or bolts 33. When the handle bar is in its normal operative position, it extends in a plane inclined upwardly and rearwardly from said rivets or bolts 33 and provides the rear members of the parallelogram seat frame 29.

34 indicates the front member of said parallelogram frame. Said front member is in the form of a U-shaped yoke, which includes sides legs 35—35 and a transverse bottom or cross bar 36. The side legs of said yoke are parallel with the legs 31 of the handle bar 30 and are engaged with the inner surfaces of frame bars 11—11 shortly to the rear of the forward bent ends 12—12 thereof and are pivotally connected to said frame bars in any suitable manner. The top ends of the legs of the yoke, which are shorter than the legs of the handle bar, are pivotally connected to the front ends of longitudinally extending side links 37 which links are parallel with the frame bars 11 and are pivotally connected to the inside of said handle bar legs 31 midway between their ends.

Secured to the inner surfaces of the links 37 are wooden bars or strips 38 to which the sides of a seat member 39 are secured, said seat member being made of a strong flexible material such as leatherette or canvas or the like. Fixed to the outer surfaces of the side legs 35 of the U-shaped yoke before mentioned are metallic straps, the ends of which are bent to form top and bottom, upwardly facing hooks 40—40, the purposes of which will appear later. When the parallelogram frame 29 is in its open or extended position, the legs 35—35 before mentioned are parallel with the legs of the handle bar 30 and said frame is held in said open position by folding brace bars as will now be described.

Said folding brace bars, each comprises two links 41—42 which are respectively pivotally connected at their outer ends, to a chassis frame bar and to a leg 31 of the handle bar as shown in Figs. 1 and 2. To the inner end of each link 41 which overhangs the like end of the associated link 42 is fixed a triangular plate 43 and to said plate is pivoted the inner end of the link 42. The operative connection between the inner ends of the links 41 and 42 together with the plates 43 provide a folding brace bar, with a locking rule or prop joint which acts to rigidly hold said links in their extended relation but which joint may be broken in a familiar manner to permit the links and the parallelogram frame to be folded down upon the chassis as shown in Fig. 3.

44 indicates a foot rest frame in the form of a longitudinally extending, horizontally disposed U-shaped member. Said frame includes side parts or legs 45 and a front cross member 46. The rear free ends of the members 45 are offset inwardly so as to be arranged inside of the handle bar 30 and brace links 41 and 42 and are pivotally connected to the curved rear end parts 16 of the chassis members 11—11. The front end parts of said legs 45 engage the outer surfaces of the members 35 before mentioned and to said front end parts and to the cross bar 46 is attached the foot rest member 47. Said member is made in the form of a pocket and of the same material as the seat 39 and is connected thereto at the sides of the perambulator by side aprons 48. The front end of the foot rest frame may be adjusted to the most advantageous elevation by engaging the side members 45 thereof upon either pair of hooks 40 as shown in full and dotted lines respectively in Fig. 2.

It will be noted from Figs. 2 and 3 that the upwardly curved rear end parts 16 of the chassis frame members 11 project upwardly beyond the periphery of the rear wheels 21. When the perambulator is folded up or collapsed as shown in Fig. 3, it may be stood up endwise upon said rear wheels and the ends 16 will rest upon the same surface as said rear wheels so that the perambulator cannot fall over. Thus the folded or collapsed perambulator may be stored in any out-of-the-way place so that it will take up but little room.

To set up or unfold the perambulator from the position shown in Fig. 3 it is only necessary to swing the handle bar upwardly and rearwardly when the parts will assume substantially the position shown in Fig. 2. Downward pressure is then applied to the links 41—42 at the plates 43 to lock the rule or prop joints between them.

The many alvantages of the invention are apparent. The perambulator may be readily set up or collapsed and when collapsed, occupies but little space. The perambulator has easy riding qualities, due to the shock absorbing means provided between the rear axle and the chassis. The foot rest may be elevated or lowered to meet the requirements of children of tender years and the entire structure is strong and rigid so that it will not warp or bend in the use for which it is intended.

While in describing my invention, I have referred to certain details of mechanical construction and arrangement and operation of parts thereof, it is to be understood that I do not limit myself thereto except as may be pointed out in the appended claims.

I claim as my invention:

1. In a perambulator, the combination of a chassis comprising longitudinally extending frame members, front and rear wheels operatively connected to said frame members, a handle bar including upwardly and rearwardly inclined side members pivotally connected at their bottom ends to said chassis frame members near their rear ends, a pair of links connected at their bottom ends to the chassis frame members forward of the handle bar side members, longitudinal bars connecting the top ends of said links with the handle bar, a seat member carried by said bars and attached to said links, a U-shaped foot rest frame pivoted at its rear ends to the rear ends of the chassis, a foot rest carried by the front end of said last mentioned frame, and means providing upwardly facing hooks on said links adapted to be engaged by the side members of said U-shaped foot rest frame to hold the same in one of a number of different positions.

2. In a perambulator, the combination of a chassis comprising longitudinally extending frame members which are inclined downwardly at their front ends and curved upwardly at their rear ends, front and rear wheels for the chassis operatively connected to said frame members, an inverted U-shaped handle bar having side legs, the bottom ends of which are connected to the chassis frame members forward of their upwardly curved ends, a U-shaped member having side legs and a bottom cross bar with the cross bar end of said member pivotally connected to said chassis frame members between their ends, seat supporting bars connecting the top ends of said last mentioned legs with said handle bar legs, a seat member supported by said bars, brace bars including breakable locking joints connecting said handle bar legs and chassis frame members, a U-shaped foot rest frame pivoted at its open rear end to the curved rear ends of said chassis frame members, a foot rest of flexible material carried by the front ends of the U-shaped foot rest frame, and means providing hooks on the side legs of the U-shaped member before mentioned adapted for engagement by the U-shaped foot rest frame to hold it in the desired elevated position In testimony whereof, I have hereunto set my hand, this 1st day of November, 1923.

FREDERICK H. HEADLEY.